(12) United States Patent
Srinivasan et al.

(10) Patent No.: US 12,348,789 B1
(45) Date of Patent: Jul. 1, 2025

(54) OPTIMIZATION OF CONSTRAINED DIRECTIONAL ENHANCEMENT FILTERING (CDEF)

(71) Applicant: Meta Platforms, Inc., Menlo Park, CA (US)

(72) Inventors: Sujith Srinivasan, Fremont, CA (US); Junqiang Lan, Fremont, CA (US); Zhijun Lei, Portland, OR (US)

(73) Assignee: Meta Platforms, Inc., Menlo Park, CA (US)

( * ) Notice: Subject to any disclaimer, the term of this patent is extended or adjusted under 35 U.S.C. 154(b) by 201 days.

(21) Appl. No.: 17/840,945

(22) Filed: Jun. 15, 2022

Related U.S. Application Data

(60) Provisional application No. 63/224,576, filed on Jul. 22, 2021.

(51) Int. Cl.
*H04N 19/00* (2014.01)
*H04N 19/117* (2014.01)
*H04N 19/13* (2014.01)
*H04N 19/137* (2014.01)
*H04N 19/154* (2014.01)
*H04N 19/172* (2014.01)
*H04N 19/176* (2014.01)
*H04N 19/182* (2014.01)
*H04N 19/186* (2014.01)
*H04N 19/463* (2014.01)
(Continued)

(52) U.S. Cl.
CPC ........... *H04N 19/85* (2014.11); *H04N 19/117* (2014.11); *H04N 19/13* (2014.11); *H04N 19/137* (2014.11); *H04N 19/154* (2014.11); *H04N 19/172* (2014.11); *H04N 19/176* (2014.11); *H04N 19/182* (2014.11); *H04N 19/186* (2014.11); *H04N 19/463* (2014.11); *H04N 19/82* (2014.11)

(58) Field of Classification Search
CPC ...... H04N 19/85; H04N 19/117; H04N 19/13; H04N 19/137; H04N 19/154; H04N 19/172; H04N 19/176; H04N 19/182; H04N 19/186; H04N 19/463; H04N 19/82
See application file for complete search history.

(56) References Cited

U.S. PATENT DOCUMENTS 8,849,053 B2   9/2014   Liu et al.
10,645,383 B2   5/2020   Zhang et al.
(Continued)

OTHER PUBLICATIONS

Zummach E., et al., "High-Throughput CDEF Architecture for the AV1 Decoder Targeting 4K@60fps Videos," IEEE 11th Latin American Symposium on Circuits & Systems (LASCAS), Feb. 28, 2020, 4 pages.

*Primary Examiner* — Zhihan Zhou
(74) *Attorney, Agent, or Firm* — Eversheds Sutherland (US) LLP (57) ABSTRACT

A video to be encoded using a codec is received Pre-filter encoding of a specific frame of the video is performed. In a single-pass processing of the specific frame, frame-level filter parameters determined using a previous frame are used to apply an in-loop filter on blocks of the specific frame during encoding of the specific frame. Statistics for the specific frame are gathered for determining frame-level filter parameters to be used for a future frame of the video. Post-filter encoding of the specific frame of the video is performed.

20 Claims, 11 Drawing Sheets

(51) Int. Cl.
*H04N 19/82* (2014.01)
*H04N 19/85* (2014.01)

(56) References Cited

U.S. PATENT DOCUMENTS

| | | | | |
|---|---|---|---|---|
| 2010/0074329 | A1* | 3/2010 | Fu | H04N 19/19 |
| | | | | 375/240.12 |
| 2012/0183050 | A1* | 7/2012 | Liu | H04N 19/196 |
| | | | | 375/240.03 |
| 2019/0045186 | A1* | 2/2019 | Zhang | H04N 19/172 |
| 2020/0162731 | A1* | 5/2020 | Kim | H04N 19/124 |
| 2020/0314424 | A1* | 10/2020 | Hu | H04N 19/463 |
| 2020/0344494 | A1* | 10/2020 | Hu | H04N 19/80 |
| 2020/0404335 | A1* | 12/2020 | Egilmez | H04N 19/70 |
| 2021/0266604 | A1* | 8/2021 | Du | H04N 19/136 |
| 2021/0400266 | A1* | 12/2021 | Du | H04N 19/44 |
| 2022/0103814 | A1* | 3/2022 | Sahraoui | H04N 19/82 |
| 2022/0116635 | A1* | 4/2022 | Yea | H04N 19/11 |
| 2022/0191526 | A1* | 6/2022 | Aggarwal | H04N 19/186 |
| 2022/0272367 | A1* | 8/2022 | Matsuba | H04N 19/157 |
| 2022/0279176 | A1* | 9/2022 | Sarwer | H04N 19/14 |
| 2022/0368897 | A1* | 11/2022 | Du | H04N 19/132 |
| 2022/0400292 | A1* | 12/2022 | Kotra | H04N 19/82 |

* cited by examiner

OPTIMIZATION OF CONSTRAINED DIRECTIONAL ENHANCEMENT FILTERING (CDEF)

CROSS REFERENCE TO OTHER APPLICATIONS

This application claims priority to U.S. Provisional Patent Application No. 63/224,576 entitled HARDWARE OPTIMIZATION OF CONSTRAINED DIRECTIONAL ENHANCEMENT FILTERING (CDEF) filed Jul. 22, 2021, which is incorporated herein by reference for all purposes.

BACKGROUND

A video coding format is a content representation format for storage or transmission of digital video content (such as in a data file or bitstream). It typically uses a standardized video compression algorithm Examples of video coding formats include H.262 (MPEG-2 Part 2), MPEG-4 Part 2, H.264 (MPEG-4 Part 10), HEVC (H.265), Theora, RealVideo RV40, VP9, and AV1. A video codec is a device or software that provides encoding and decoding for digital video. Most codecs are typically implementations of video coding formats.

Recently, there has been an explosive growth of video usage on the Internet. Some websites (e.g., social media websites or video sharing websites) may have billions of users and each user may upload or download one or more videos each day. When a user uploads a video from a user device onto a website, the website may store the video in one or more different video coding formats, each being compatible with or more efficient for a certain set of applications, hardware, or platforms. Therefore, higher video compression rates are desirable. For example, VP9 offers up to 50% more compression compared to its predecessor. However, with higher compression rates come higher computational complexity; therefore, improved hardware architecture and techniques in video coding would be desirable.

BRIEF DESCRIPTION OF THE DRAWINGS

Various embodiments of the disclosure are disclosed in the following detailed description and the accompanying drawings.

DETAILED DESCRIPTION

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Figure 1:
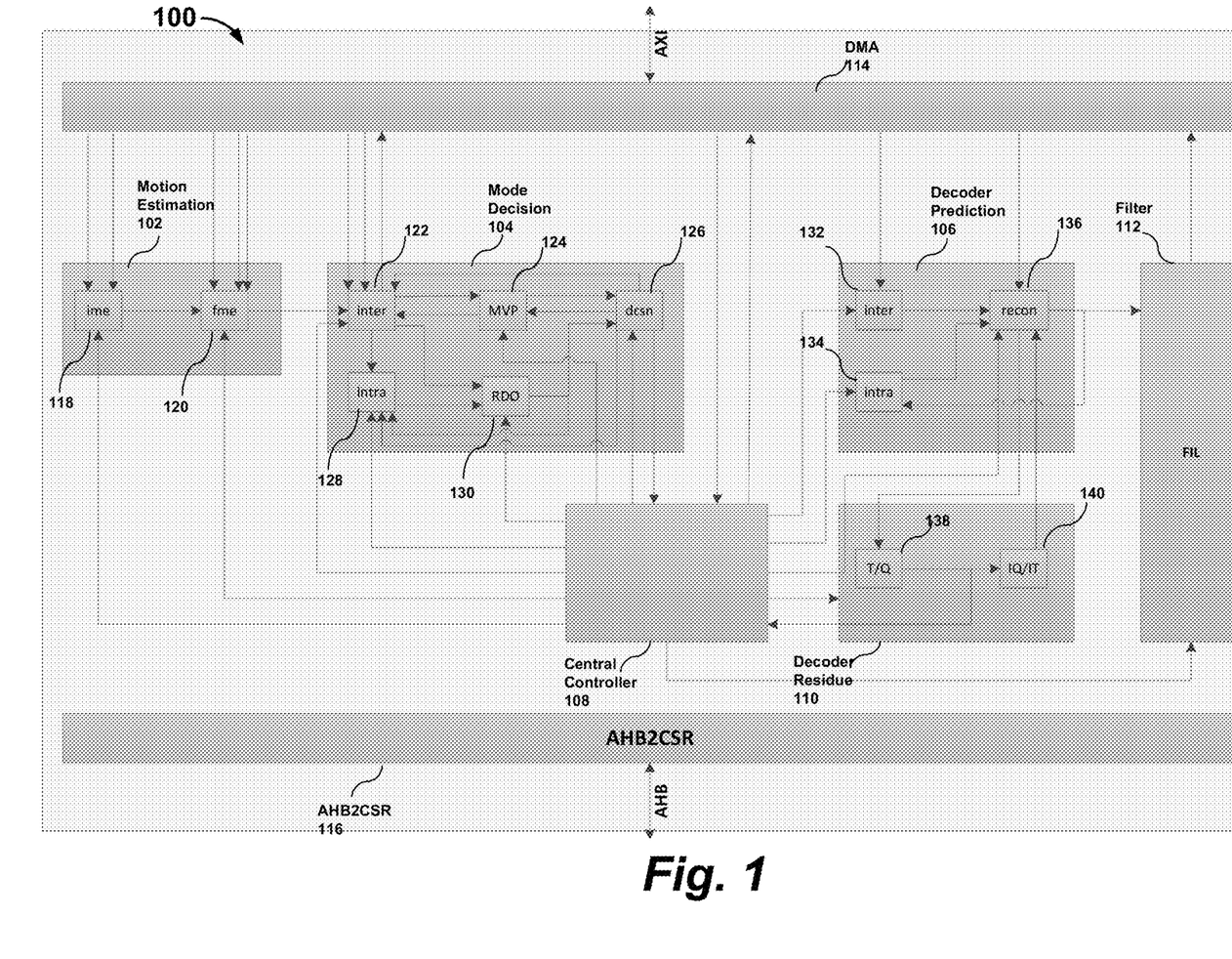
FIG. 1 illustrates a block diagram of an embodiment of a video encoder 100.

FIG. 1 illustrates a block diagram of an embodiment of a video encoder 100. For example, video encoder 100 supports the video coding format H.264 (MPEG-4 Part 10). However, video encoder 100 may also support other video coding formats as well, such as H.262 (MPEG-2 Part 2), MPEG-4 Part 2, HEVC (H.265), Theora, RealVideo RV40, AV1 (Alliance for Open Media Video 1), and VP9.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller module 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction; it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks known as macroblocks. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference frame. The process of motion vector determination is called motion estimation.

Video encoder 100 includes a mode decision module 104. The main components of mode decision module 104 include an inter prediction module 122, an intra prediction module 128, a motion vector prediction module 124, a rate-distortion optimization (RDO) module 130, and a decision module 126. Mode decision module 104 detects one prediction mode among a number of candidate inter prediction modes and intra prediction modes that gives the best results for encoding a block of video.

Decoder prediction module 106 includes an inter prediction module 132, an intra prediction module 134, and a reconstruction module 136. Decoder residue module 110 includes a transform and quantization module (T/Q) 138 and an inverse quantization and inverse transform module (IQ/IT) 140.

Constrained Directional Enhancement Filtering (CDEF) is an in-loop post-processing technique used in the AV1 video codec. On the encoder side, the video is compressed. On the decoder side, the video is decompressed, but noise is introduced to the video. CDEF is used in the AV1 video codec to improve the picture quality of the decompressed but noisy video.

Figure 2:
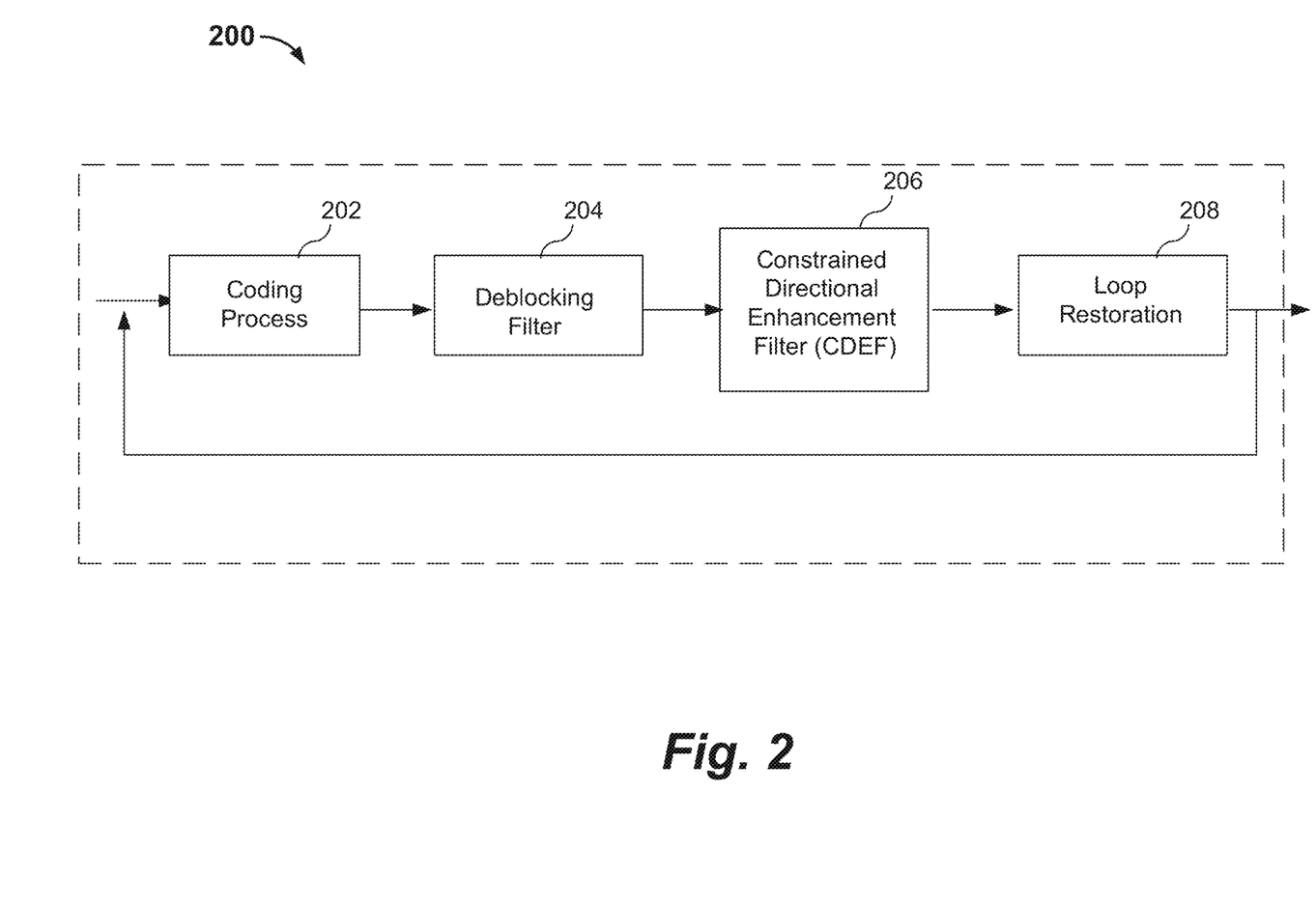
FIG. 2 illustrates a block diagram of a coding loop 200, which is included in filter 112 of video encoder 100.

FIG. 2 illustrates a block diagram of a coding loop 200, which is included in filter 112 of video encoder 100. As shown in FIG. 2, coding loop 200 includes a coding process 202, a deblocking filter 204, a Constrained Directional Enhancement Filter (CDEF) 206, and a loop restoration filter 208. Deblocking filter 204 removes bordering artifacts at the edges of coded blocks. Loop restoration filter 208 includes denoising filters that remove Discrete Cosine Transform (DCT) basis noise via a configurable amount of blurring.

CDEF is a directional edge adaptive filter applied on the encoder and the decoder. The CDEF in-loop filtering is based on non-linear low-pass filtering and is designed for vectorization efficiency. CDEF identifies the direction of each block and then adaptively filters along the identified direction and to a lesser degree along directions rotated 45 degrees from the identified direction. The filter strengths are signaled explicitly, which allows a high degree of control over the blurring. The encoder performs an efficient search for the filter strengths.

For the luma components (that represent the brightness), CDEF includes two filters: a primary filter and a secondary filter. Similarly, for the chroma components (that represent the color information), CDEF also includes a primary filter and a secondary filter. The primary filter runs along the selected filter direction, and the secondary filter runs across the selected direction at a 45° angle.

CDEF uses constrained low-pass filtering in which the value of each filter tap is first processed through a constraint function parameterized by the difference between the tap value and pixel being filtered d, the filter strength S, and the filter damping parameter D. $S^{(p)}$ and $S^{(s)}$ are the strength parameters of the primary filter and the secondary filter, respectively. $S^{(p)}$ and $S^{(s)}$ are chosen independently for luma and chroma.

The encoder searches for the optimum strength parameters and signals them to the decoder. The signals are sent to the decoder as part of the bitstream. Each frame is divided into filter blocks (e.g., 64×64 pixels). Some CDEF parameters are signaled at the frame level, and some may be signaled at the filter block level. At the frame level, a list of 1, 2, 4, or 8 presets is signaled to the decoder. Each preset includes the following: the luma primary strength (4 bits), the luma secondary strength (2 bits), the chroma primary strength (4 bits), and the chroma secondary strength (2 bits). At the block level, each block has its own set of parameters (preset). For each filter block, 0 to 3 bits are used to indicate the best preset that is used for the block of 64×64 pixels.

On the encoder side, the search determines both the frame level parameters (preset parameters and the number of presets) and the filter block-level preset ID. Assuming the presets are already chosen, the ID for each filter block is chosen by minimizing a distortion metric over the filter block. The distortion metric may be the sum of squared error (SSE), defined as $D=\|s-d\|^2$, where s is a vector containing the source (uncoded) pixels for the filter block and d contains the decoded pixels, filtered using a particular preset. The distortion metric may also be the mean squared error (MSE), which is the SSE divided by the sample size.

In some embodiments, the distortion metrics may be computed and stored in an array. Let N be the number of strength combinations, where N is the number of primary filter strength candidates*the number of secondary filter strength candidates. For example, N=16 primary filter strength candidates*4 secondary filter strength candidates=64. The MSE array is a multi-dimensional array MSE[2][#blocks][N], where MSE[0] and MSE[1] correspond to luma and chroma, respectively.

Figure 3:
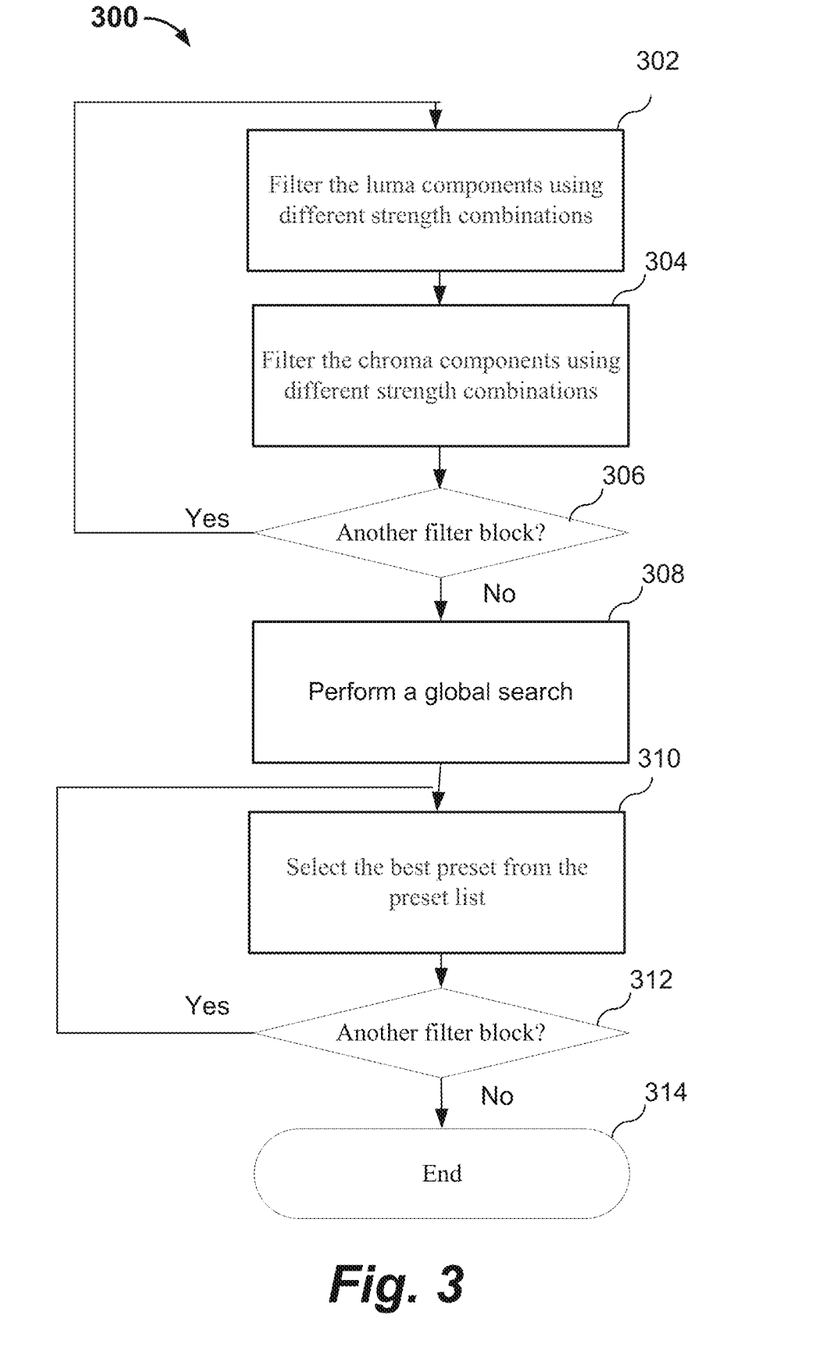
FIG. 3 illustrates an exemplary process 300 for selecting presets.

FIG. 3 illustrates an exemplary process 300 for selecting presets. At step 302, for a filter block $b_i$, the luma components are filtered using different strength combinations n; where $n_i \varepsilon 0, 1, 2, \ldots N-1$ The filtered values may be stored in MSE[0][$b_i$][$n_i$]. At step 304, for a filter block $b_i$, the chroma components are filtered using different strength combinations $n_j$ where $n_i \varepsilon 0, 1, 2, N-1$. The filtered values may be stored in MSE[1][$b_i$][$n_i$].

At step 306, it is determined whether there is another filter block within the frame of video. If there is another filter block, process 300 returns to step 302 and step 304, otherwise, process 300 proceeds to step 308. At step 308, the end of the frame is reached, and the MSE array has been populated with the distortion metrics. A global search is performed. The global search determines an optimum preset list. The preset list may include 1, 2, 4, or 8 presets, where a preset may be one of the $N^2$ number of possible presets.

At step 310, for each filter block $b_i$, the best preset is selected from the preset list. At step 312, it is determined whether there is another filter block within the frame of video. If there is another filter block, process 300 returns to step 310; otherwise, process 300 terminates at step 314. After process 300 is finished, the pixels may be filtered using the determined strengths and the filtered reconstruction pixels are passed to other modules.

At the decoder, at the beginning of the frame, the list of presets valid for the frame is obtained. For each filter block, the best filter block-level preset ID) is obtained. The filter block is then filtered using a strength setting that is indexed by the preset ID on the preset list. For example, suppose that four presets are valid for a frame, each block will receive an index from 0 to 3. If the preset ID for filter block #1 is 0, then filter block #1 is filtered using the strength settings corresponding to the first of the four presets on the preset list.

Figure 4:
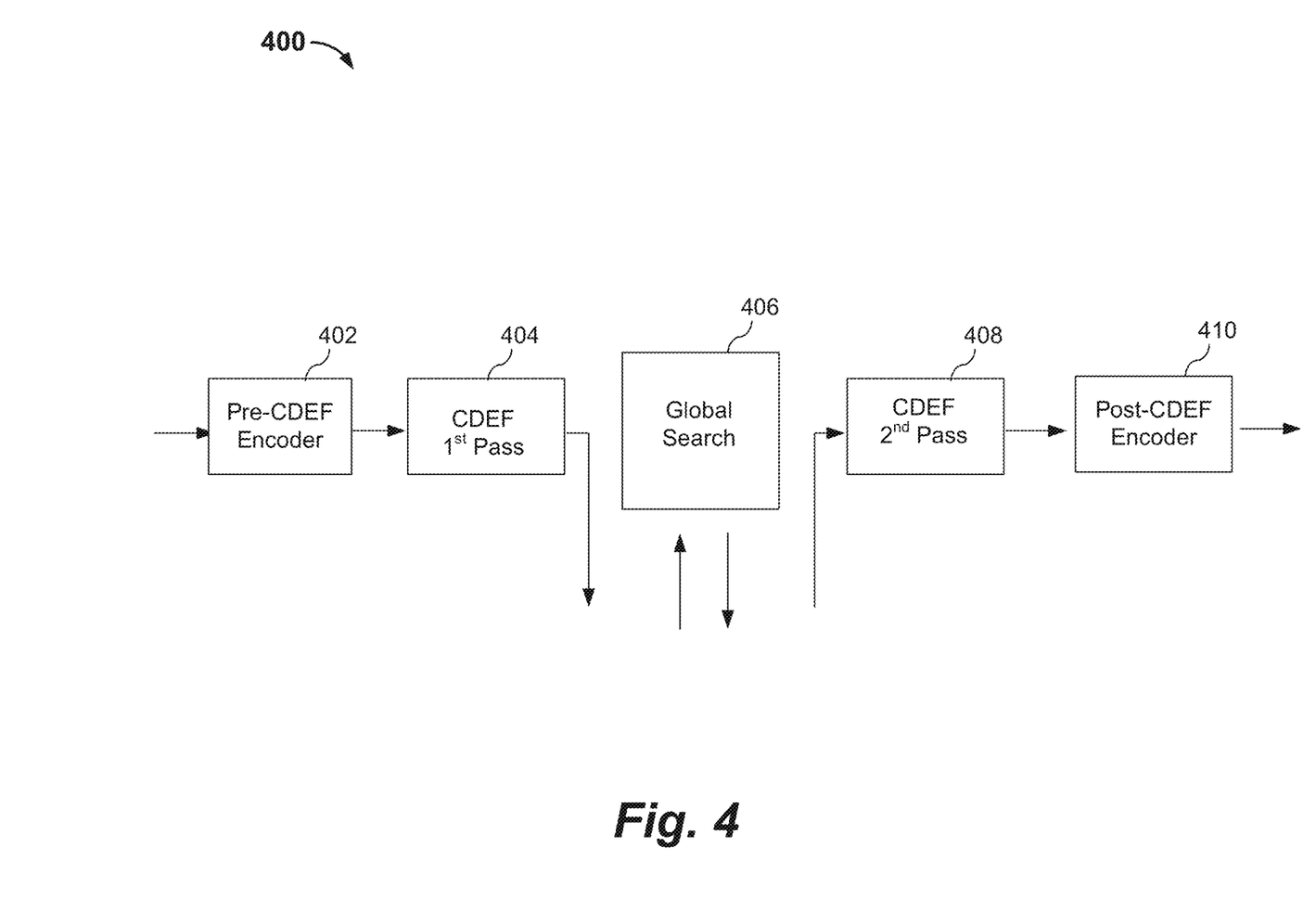
FIG. 4 illustrates a typical block diagram 400 of an encoder with CDEF

FIG. 4 illustrates a typical block diagram 400 of an encoder with CDEF. Block diagram 400 includes a pre-CDEF encoder 402, a CDEF $1^{st}$ pass module 404, a global search module 406, a CDEF $2^{nd}$ pass module 408, and a post-CDEF encoder 410. Pre-CDEF encoder 402 performs different stages of processing prior to sending the reconstruction pixels to CDEF, including motion detection and mode decision. During the first pass, CDEF $1^{st}$ pass module 404 collects the statistics for each block of image and stores them in the MSE array. Global search module 406 determines an optimum preset list. The preset list may include 1, 2, 4, or 8 presets, where a preset may be one of the $N^2$ number of possible presets. Global search may be done by dedicated hardware or firmware. The best presets may be stored on-chip. During the second pass, CDEF $2^{nd}$ pass module 408 filters each block using the best settings that are chosen from the preset list. Post-CDEF encoder 410 performs different stages of processing after the CDEF processing, including loop reconstruction and entropy coding.

The problem with CDEF is that it is a two-pass encoding technique. Two-pass encoding, also known as multi-pass encoding, is a video encoding strategy used to retain the best quality during conversion. In the first pass of a two-pass encoding, the input data from the source clip is analyzed to collect some statistics. The collected data from the first pass is used to make appropriate decisions for selecting encoding parameters for the second pass, thereby achieving the best encoding quality. In multi-pass encoding, intermediate results may include block level statistics that are obtained from pre-processing the video. For example, block level statistics (e.g., statistics of pixel values or coefficient values) may be obtained after the first pass of a two-pass encoding.

In CDEF, during the first pass of the two-pass encoding, statistics are collected for each block of image and stored in the MSE array. At the end of each frame, a global search is done. During the second pass, the strength results of the global search are used to filter the images. Since the global search uses the statistics of the entire frame, CDEF cannot be performed in a single pass. However, a two-pass operation with custom hardware is costly for various reasons. Both the pixels and statistical data (including the MSE array and the best presets) need to be stored on-chip or off-chip in DRAMs, causing extra bandwidth and storage. There is a one-frame latency, which adds to the overall latency of the encoder. In addition, CDEF $2^{nd}$ pass module 408 needs to read the stored pixels again.

In the present application, an in-loop filtering method is disclosed. A video to be encoded using a codec is received. Pre-filter encoding of a specific frame of the video is performed. In a single-pass processing of the specific frame, frame-level filter parameters determined using a previous frame are used to apply an in-loop filter on blocks of the specific frame during encoding of the specific frame. Statistics for the specific frame are gathered for determining frame-level filter parameters to be used for a future frame of the video. Post-filter encoding of the specific frame of the video is performed.

In some embodiments, the step of using the frame-level filter parameters determined based on the previous frame to apply the in-loop filter on the blocks of the specific frame during encoding of the specific frame comprises determining a preset list, wherein the preset list comprises the frame-level filter parameters. It further comprises selecting for a block of the specific frame a preset among the preset list. It further comprises filtering the block of the specific frame with the in-loop filter using the selected preset. The in-loop filter comprises a luma primary filter, a luma secondary filter, a chroma primary filter, and a chroma secondary filter. A preset on the preset list comprises, a luma primary filter strength parameter, a luma secondary filter strength parameter, a chroma primary filter strength parameter, and a chroma secondary filter strength parameter.

In some embodiments, the step of gathering the statistics for the specific frame for determining the frame-level filter parameters to be used for the future frame of the video comprises filtering blocks of the specific frame using different combinations of filter strength parameters for a primary filter and a secondary filter of the in-loop filter. It further comprises gathering distortion metrics associated with the filtered blocks. It further comprises searching the gathered distortion metrics for determining the frame-level filter parameters to be used for the future frame of the video.

In some embodiments, the determined frame-level filter parameters comprise a preset list for the specific frame, wherein the preset list comprises one of the following: 1 preset, 2 presets, 4 presets, and 8 presets. A preset comprises: a luma primary filter strength parameter, a luma secondary filter strength parameter, a chroma primary filter strength parameter, or a chroma secondary filter strength parameter.

In some embodiments, the single-pass processing of the specific frame comprises reading pixels after the pre-filter encoding once. In some embodiments, the step of using the frame-level filter parameters determined based on the previous frame to apply the in-loop filter on the blocks of the specific frame during encoding of the specific frame and the step of gathering the statistics for the specific frame for determining the frame-level filter parameters to be used for the future frame of the video are performed in parallel.

In some embodiments, whether one of a plurality of criteria is met is detected. In response to detecting that one of the plurality of criteria is met, predetermined frame-level filter parameters are used to apply an in-loop filter on blocks of the specific frame during encoding of the specific frame. In addition, statistics for the specific frame are gathered for determining frame-level filter parameters to be used for a future frame of the video. The plurality of criteria comprises one of the following: the specific frame is a first frame of the video, the specific frame is a frame after a scene change, or the specific frame is an intra frame.

An encoder is disclosed. The system includes a processor configured to receive a video to be encoded using a codec. The processor is configured to perform pre-filter encoding of a specific frame of the video. In a single-pass processing of the specific frame, frame-level filter parameters determined based on a previous frame is used to apply an in-loop filter on blocks of the specific frame during encoding of the specific frame. In the single-pass processing of the specific frame, statistics for the specific frame are gathered for determining frame-level filter parameters to be used for a future frame of the video. Post-filter encoding of the specific frame of the video is performed. The system further includes a memory coupled to the processor and configured to provide the processor with instructions.

An encoder is disclosed. The system includes an interface to receive a video to be encoded using a codec. The system includes a circuitry to perform pre-filter encoding of a specific frame of the video. In a single-pass processing of the specific frame, the circuitry is configured to use frame-level filter parameters determined based on a previous frame to apply an in-loop filter on blocks of the specific frame during encoding of the specific frame. In the single-pass processing of the specific frame, the circuitry is configured to gather statistics for the specific frame for determining frame-level filter parameters to be used for a future frame of the video. The circuitry is configured to perform post-filter encoding of the specific frame of the video.

Figure 5:
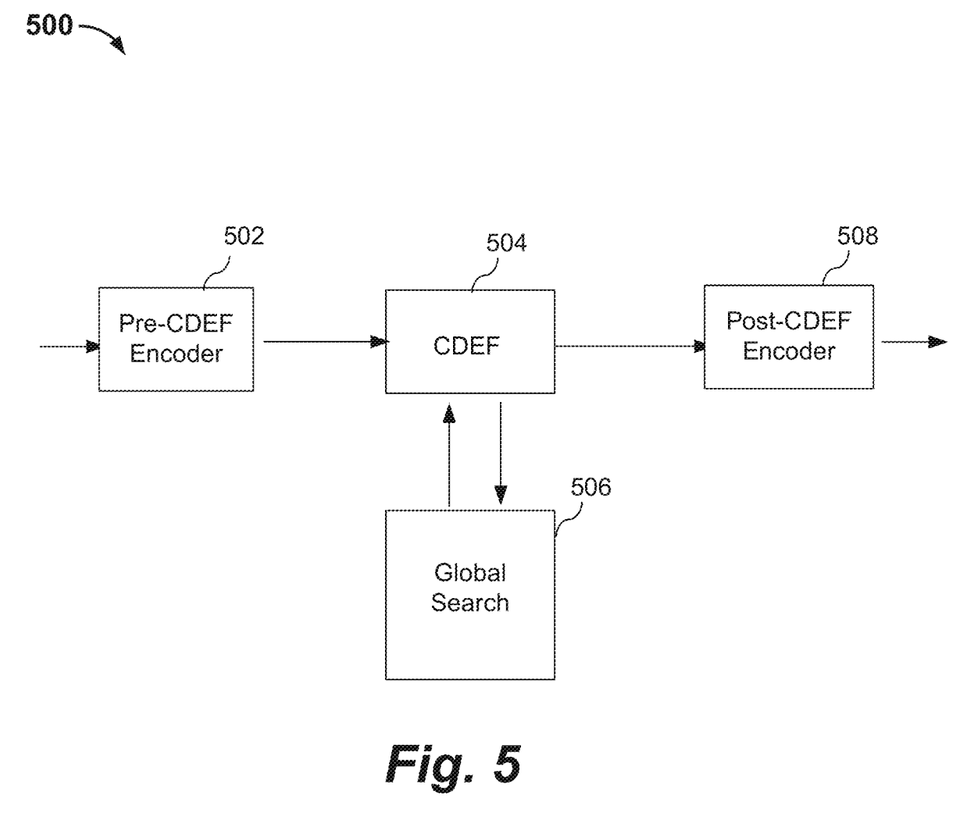
FIG. 5 illustrates a block diagram of an improved encoder 500 with CDEF.

FIG. 5 illustrates a block diagram of an improved encoder 500 with CDEF. Encoder 500 includes a pre-CDEF encoder 502, a CDEF module 504, a global search module 506, and a post-CDEF encoder 508. Pre-CDEF encoder 502 performs different stages of processing prior to sending the reconstruction pixels to CDEF, including motion detection and mode decision. Post-CDEF encoder 508 performs different stages of processing after the CDEF processing, including loop reconstruction and entropy coding. By using previous frame statistics to select presets for the current frame of video, CDEF module 504 is a one-pass operation, which has many advantages, including reducing bandwidth and storage requirements, latency, and hardware complexity of the encoder. CDEF module 504 only needs to store the metadata (such as the MSE array and the best presets) but does not need to store the pixels for reading them a second time. As will be described in greater detail below, the global search does not cause extra latency in the encoder. The global search may be implemented in hardware or firmware.

Figure 6:
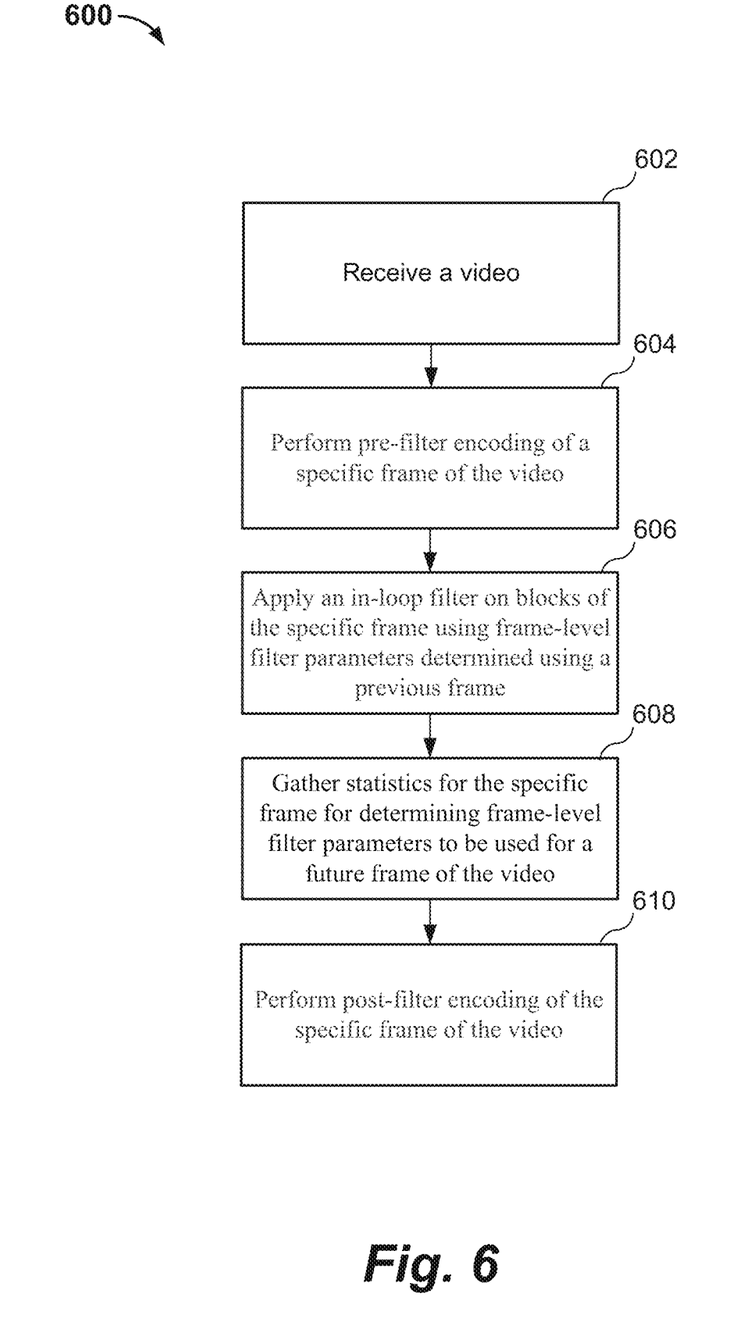
FIG. 6 illustrates an exemplary process 600 for encoding a video with CDEF.

FIG. 6 illustrates an exemplary process 600 for encoding a video with CDEF. In some embodiments, process 600 may be performed by encoder 500 of FIG. 5 for each frame of the video.

At step 602, a video to be encoded using a codec is received. For example, the codec may be one that includes a coding loop that includes a coding process, a deblocking filter, a Constrained Directional Enhancement Filter (CDEF), and a loop restoration filter. The codec may be one that supports the AV1 video coding format.

At step 604, pre-filter encoding of a specific frame of the video is performed. For example, the pre-filtering includes the processing performed by pre-CDEF encoder 502. Pre-CDEF encoder 502 performs different stages of processing prior to sending the reconstruction pixels to CDEF module 504, including motion detection and mode decision.

Next, CDEF is performed on the specific frame of the video in a single-pass operation, instead of a traditional two-pass encoding operation. It is a single-pass operation because for each block of the current frame, a preset list that is determined by previous frame statistics is used. The single-pass operation may be performed by CDEF module 504 of FIG. 5.

Figure 7:
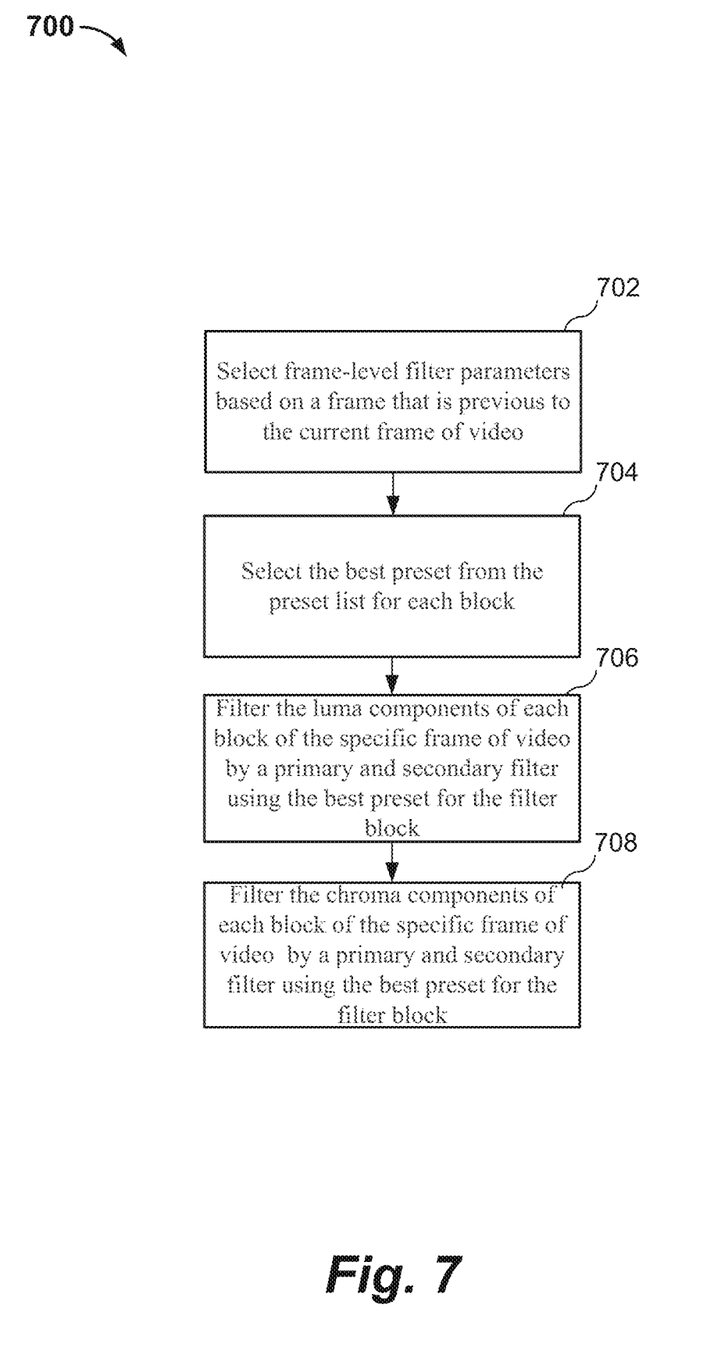
FIG. 7 illustrates an exemplary process 700 for applying an in-loop filter on the filter blocks of a specific frame.

At step 606, frame-level filter parameters determined based on a previous frame are used to apply an in-loop filter on the blocks of the specific frame during encoding of the specific frame. FIG. 7 illustrates an exemplary process 700 for applying an in-loop filter on the filter blocks of a specific frame. In some embodiments, process 700 may be executed at step 606 of process 600.

At step 702, frame-level filter parameters are selected based on a frame that is previous to the current frame of video. For example, the frame-level filter parameters comprise an optimum preset list. The optimum preset list may be selected based on statistics and metadata collected for the frame that is immediately prior to the current frame of video. Alternatively, the optimum preset list may be selected based on a frame that is M frames prior to the current frame of video, where M is an integer that is greater than or equal to two. Because the previous frame of video was received earlier and has already been processed, the statistics and metadata associated with the entire previous frame are ready and can be accessed from storage without any delay. For example, the array of distortion metrics (e.g., the MSE array) associated with the previous frame has been populated and a global search of the array has already been performed by global search module 506, which determines the optimum preset list. The preset list may include 1, 2, 4, or 8 presets, where a preset may be one of the $N^2$ number of possible presets.

At step 704, the best preset for each block is selected from the preset list. At the block level, each block has its own set of parameters (preset). For each filter block, 0 to 3 bits are used to indicate the best preset that is used for the block of 64×64 pixels. Next, each block of the specific frame is filtered with the in-loop filter using the selected best preset. At step 706, the luma components of each block of the specific frame of video are filtered by a primary and secondary filter using the best preset for the filter block. For the luma components (that represent the brightness), CDEF includes two filters: a primary filter and a secondary filter. The primary filter runs along the selected filter direction, and the secondary filter runs across the selected direction at a 45° angle.

At step 708, the chroma components of each block of the specific frame of video are filtered by a primary and secondary filter using the best preset for the filter block. For the chroma components (that represent the brightness), CDEF includes two filters: a primary filter and a secondary filter. The primary filter runs along the selected filter direction, and the secondary filter runs across the selected direction at a 45° angle.

Figure 8:
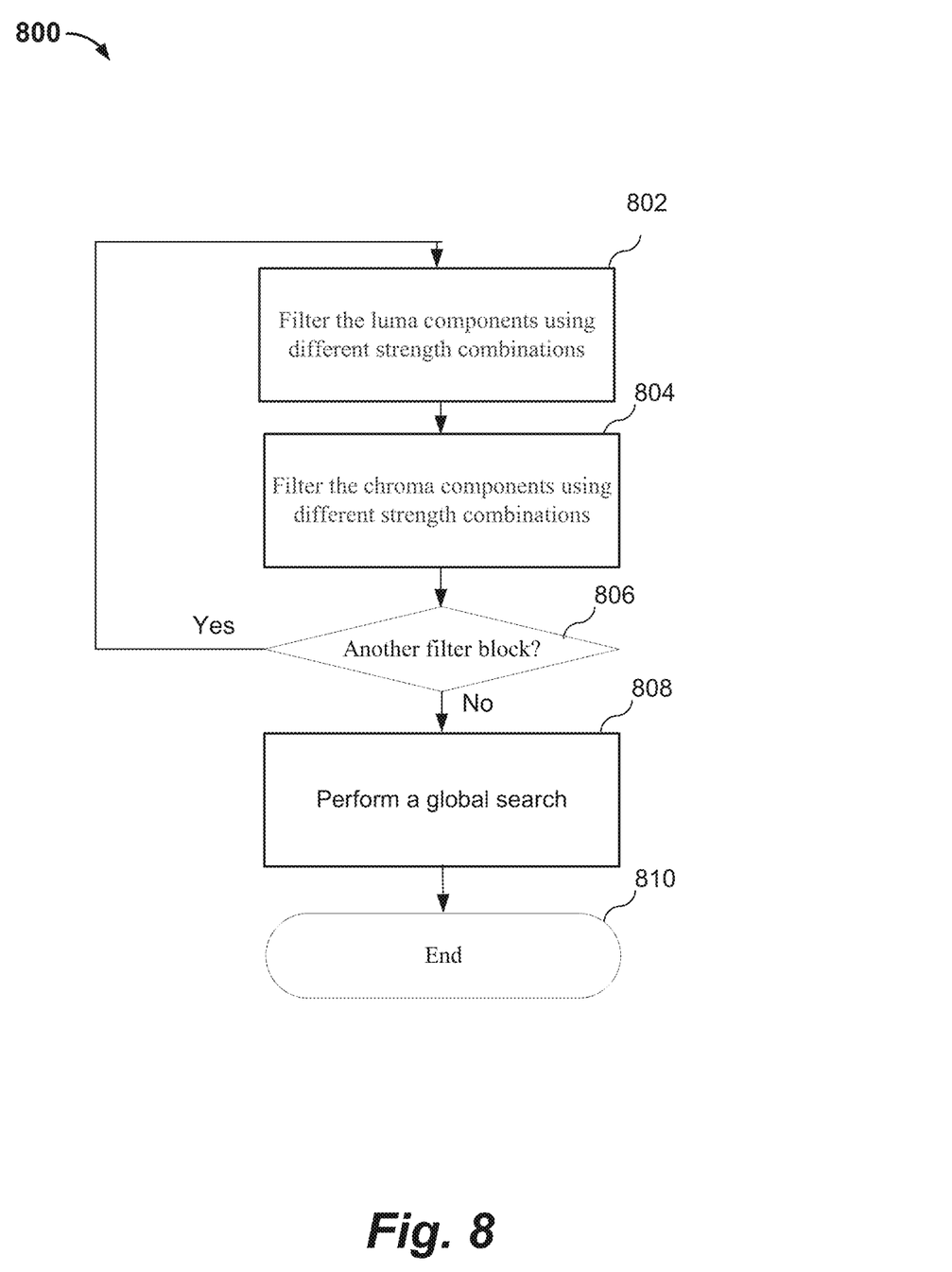
FIG. 8 illustrates an exemplary process 800 for collecting statistics for a frame of video for determining frame-level filter parameters.

Referring back to FIG. 6, at step 608, statistics for the specific frame are gathered for determining frame-level filter parameters to be used for a future frame of the video. FIG. 8 illustrates an exemplary process 800 for collecting statistics for a frame of video for determining frame-level filter parameters. In some embodiments, process 800 may be executed at step 608 of process 600.

At step 802, for a filter block $b_i$, the luma components are filtered using different strength combinations $n_i$ where $n_i \varepsilon 0, 1, 2, \ldots N-1$. The filtered values may be stored in MSE[0][$b_i$][$n_i$]. At step 804, for a filter block $b_i$, the chroma components are filtered using different strength combinations $n_i$ where $n_i \varepsilon 0, 1, 2, \ldots N-1$. The filtered values may be stored in MSE[1][$b_i$][$n_i$].

At step 806, it is determined whether there is another filter block within the frame of video. If there is another filter block, process 800 returns to step 802 and step 804, otherwise, process 800 proceeds to step 808. At step 808, the end of the frame is reached, and the MSE array has been populated with the distortion metrics. A global search is performed by global search module 506. The global search determines an optimum preset list. The preset list may include 1, 2, 4, or 8 presets, where a preset may be one of the $N^2$ number of possible presets. At step 810, process 800 is finished.

It should be recognized that step 606 and step 608 are not interdependent on each other. Therefore, step 606 and step 608 may be performed in parallel or in a different order.

Referring back to FIG. 6, at step 610, post-filter encoding of the specific frame of the video is performed. For example, the post-filtering includes the processing performed by post-CDEF encoder 508. Post-CDEF encoder 508 performs different stages of processing after the CDEF processing, including loop reconstruction and entropy coding.

Figure 9:
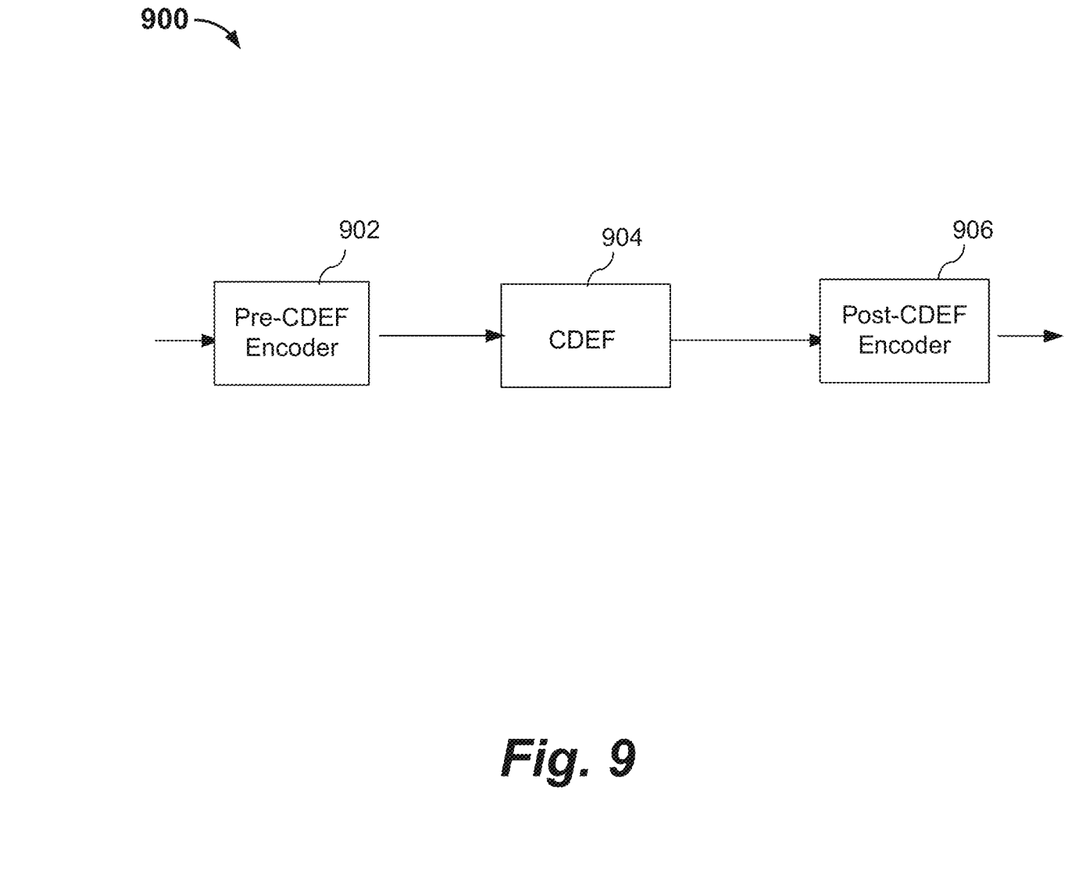
FIG. 9 illustrates a block diagram of another improved encoder 900 with CDEF.

FIG. 9 illustrates a block diagram of another improved encoder 900 with CDEF. Encoder 900 includes a pre-CDEF encoder 902, a CDEF module 904, and a post-CDEF encoder 906. Pre-CDEF encoder 902 performs different stages of processing prior to sending the reconstruction pixels to CDEF, including motion detection and mode decision. Post-CDEF encoder 906 performs different stages of processing after the CDEF processing, including loop reconstruction and entropy coding. In this embodiment, by fixing the preset list, the global search may be omitted. In this embodiment, CDEF module 904 is a one-pass operation, which has many advantages, including reducing bandwidth and storage requirements, latency, and hardware complexity of the encoder. CDEF module 904 does not need to store the pixels for reading them a second time.

Figure 10:
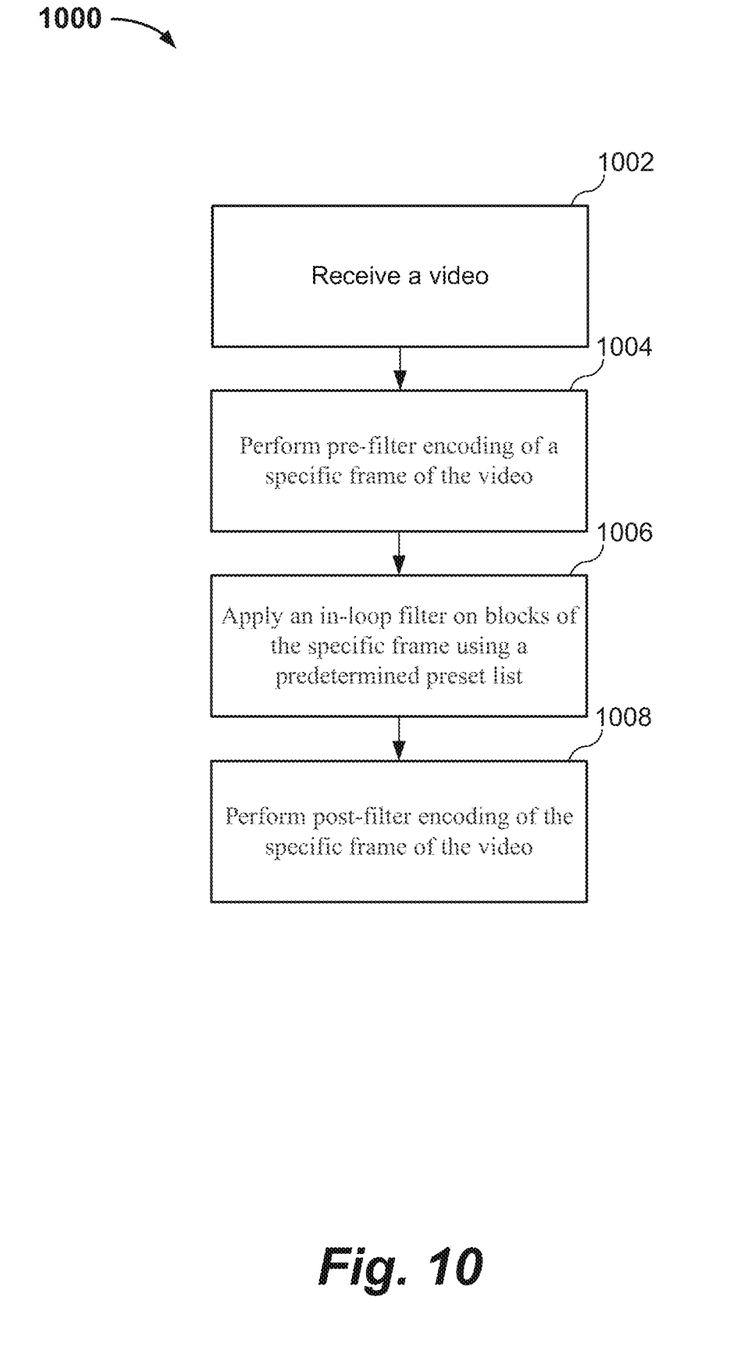
FIG. 10 illustrates an exemplary process 1000 for encoding a video with CDEF.

FIG. 10 illustrates an exemplary process 1000 for encoding a video with CDEF. In some embodiments, process 1000 may be performed by encoder 900 of FIG. 9 for at least some frames of the video.

At step 1002, a video to be encoded using a codec is received. For example, the codec may be one that includes a coding loop that includes a coding process, a deblocking filter, a Constrained Directional Enhancement Filter (CDEF), and a loop restoration filter. The codec may be one that supports the AV1 video coding format.

At step 1004, pre-filter encoding of a specific frame of the video is performed. For example, the pre-filtering includes the processing performed by pre-CDEF encoder 902. Pre-CDEF encoder 902 performs different stages of processing prior to sending the reconstruction pixels to CDEF module 904, including motion detection and mode decision.

Next, CDEF is performed on the specific frame of the video in a single-pass operation, instead of in a traditional two-pass encoding operation. It is a single-pass operation because for each block of the current frame, a predetermined preset list is used, thereby removing the global search step. The single-pass operation may be performed by CDEF module 904 of FIG. 9.

Figure 11:
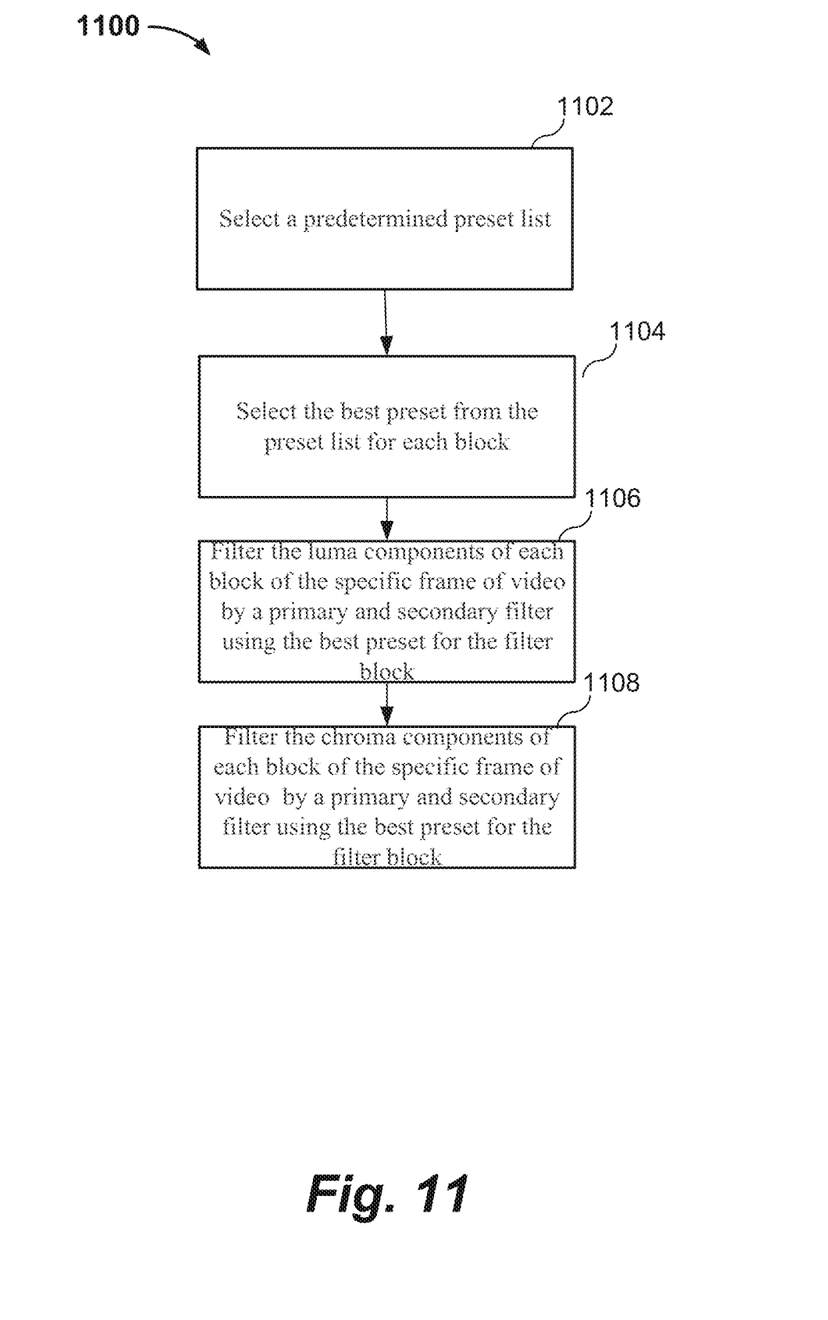
FIG. 11 illustrates an exemplary process 1100 for applying an in-loop filter on the filter blocks of a specific frame.

At step 1006, a predetermined preset list is used to apply an in-loop filter on the blocks of the specific frame during encoding of the specific frame. FIG. 11 illustrates an exemplary process 1100 for applying an in-loop filter on the filter blocks of a specific frame. In some embodiments, process 1100 may be executed at step 1006 of process 1000.

At step 1102, a predetermined list of frame-level filter parameters is selected. Normally, the preset list for a frame may include 1, 2, 4, or 8 presets, where a preset may be one of the $N^2$ number of possible presets. In this embodiment, the preset list may have a predetermined number of presets. The preset list may be programmed to include only 2, 4, or 8 number of presets. For example, if the number of presets on the preset list is configured to be fixed at 4, then 4 presets are selected to be on the preset list.

In some embodiments, the number of presets on the preset list and the presets selected to be included on the preset list may be determined based on different factors, including the type of content, compression rate, and the like. In some embodiments, machine learning may be used to determine the number of presets on the preset list or the presets selected to be included on the preset list based on the source pixels, encoder parameters, and the like.

At step 1104, the best preset for each block is selected from the preset list. The best preset may be selected such that the MSE error is minimized. At the block level, each block has its own set of parameters (preset).

At step 1106, the luma components of each block of the specific frame of video is filtered by a primary and secondary filter using the best preset for the filter block. For the luma components (that represent the brightness), CDEF includes two filters: a primary filter and a secondary filter. The primary filter runs along the selected filter direction, and the secondary filter runs across the selected direction at a 45° angle.

At step 1108, the chroma components of each block of the specific frame of video is filtered by a primary and secondary filter using the best preset for the filter block. For the chroma components (that represent the brightness), CDEF includes two filters: a primary filter and a secondary filter. The primary filter runs along the selected filter direction, and the secondary filter runs across the selected direction at a 45° angle.

Referring back to FIG. 10, at step 1008, post-filter encoding of the specific frame of the video is performed. For example, the post-filtering includes the processing performed by post-CDEF encoder 906. Post-CDEF encoder 906 performs different stages of processing after the CDEF processing, including loop reconstruction and entropy coding.

In some embodiments, encoder 500 of FIG. 5 and encoder 900 of FIG. 9 may be combined to handle different frames of a video sequence. In some embodiments, encoder 900 may be used to process the first frame of a video because previous frame statistics are not yet available. In some embodiments, encoder 900 may be used to process a frame that is after a scene change in the video. This is because previous frame statistics used by encoder 500 do not represent the current frame well. In some embodiments, encoder 900 may be used to process a frame that is an intra frame. This is because previous frame statistics used by encoder 500 do not represent the current frame well.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A system, comprising:
  a processor configured to:
    receive a video to be encoded using a codec;
    perform pre-filter encoding of a specific frame of the video;
    in a single-pass processing of the specific frame:
      use a first set of frame-level filter parameters determined based on a previous frame to apply an in-loop filter on blocks of the specific frame during encoding of the specific frame, including:
        determining a preset list, wherein the preset list comprises the first set of frame-level filter parameters, and wherein the preset list comprises a plurality of presets selected based on a type of content and a compression rate; and
        selecting for a block of the specific frame a preset among the preset list, wherein the preset is selected based on minimizing of a mean squared error (MSE) and wherein the block has its own respective set of parameters; and
      gather statistics for the specific frame for determining a second set of frame-level filter parameters to be used for a future frame of the video; and perform post-filter encoding of the specific frame of the video; and a memory coupled to the processor and configured to provide the processor with instructions.

2. The system of claim 1, wherein the in-loop filter comprises a luma primary filter, a luma secondary filter, a chroma primary filter, and a chroma secondary filter, and wherein a preset of the preset list comprises: a luma primary filter strength parameter, a luma secondary filter strength parameter, a chroma primary filter strength parameter, and a chroma secondary filter strength parameter.

3. The system of claim 1, wherein gathering the statistics for the specific frame for determining the second set of frame-level filter parameters to be used for the future frame of the video comprises:

filtering the blocks of the specific frame using different combinations of filter strength parameters for a primary filter and a secondary filter of the in-loop filter;

gathering distortion metrics associated with the filtered blocks; and searching the gathered distortion metrics for determining the second set of frame-level filter parameters to be used for the future frame of the video.

4. The system of claim 1, wherein the determined frame-level filter parameters comprise a preset list for the specific frame, wherein the preset list comprises one of the following: 1 preset, 2 presets, 4 presets, or 8 presets.

5. The system of claim 4, wherein a preset comprises: a luma primary filter strength parameter, a luma secondary filter strength parameter, a chroma primary filter strength parameter, and a chroma secondary filter strength parameter.

6. The system of claim 1, wherein the single-pass processing of the specific frame comprises reading pixels after the pre-filter encoding once.

7. The system of claim 1, wherein the step of using the first set of frame-level filter parameters determined based on the previous frame to apply the in-loop filter on the blocks of the specific frame during encoding of the specific frame and the step of gathering the statistics for the specific frame for determining the second set of frame-level filter parameters to be used for the future frame of the video are performed in parallel.

8. The system of claim 1, wherein the processor is further configured to:

detect whether one of a plurality of criteria is met; and in response to detecting that one of the plurality of criteria is met:

use a third set of predetermined frame-level filter parameters to apply an in-loop filter on blocks of the specific frame during encoding of the specific frame; and gather statistics for the specific frame for determining the second set of frame-level filter parameters to be used for the future frame of the video.

9. The system of claim 8, wherein the plurality of criteria comprises one of the following: the specific frame is a first frame of the video, the specific frame is a frame after a scene change, or the specific frame is an intra frame.

10. The system of claim 1, wherein the pre-filter encoding comprises motion detection and motion decision, and wherein the post-filter encoding comprises loop reconstruction and entropy coding, and wherein the in-loop filter comprises a Constrained Directional Enhancement Filter (CDEF), and wherein the codec comprises an AV1 video codec.

11. The system of claim 1, wherein applying an in-loop filter on blocks of the specific frame during encoding of the specific frame further includes filtering the block of the specific frame with the in-loop filter via a luma primary filter, a luma secondary filter, a chroma primary filter, and a chroma secondary filter using the selected preset, and wherein the primary luma filter runs along the selected filter direction, and the secondary luma filter runs across the selected direction at a 45° angle, and the primary chroma filter runs along the selected filter direction, and the secondary chroma filter runs across the selected direction at a 45° angle.

12. A method, comprising:

receiving a video to be encoded using a codec;

performing pre-filter encoding of a specific frame of the video;

in a single-pass processing of the specific frame:

using a first set of frame-level filter parameters determined based on a previous frame to apply an in-loop filter on blocks of the specific frame during encoding of the specific frame, including determining a preset list, wherein the preset list comprises the first set of frame-level filter parameters, and wherein the preset list comprises a plurality of presets selected based on a type of content and a compression rate; and filtering the block of the specific frame with the in-loop filter via a luma primary filter, a luma secondary filter, a chroma primary filter, and a chroma secondary filter using the selected presets; and gathering statistics for the specific frame for determining a second set of frame-level filter parameters to be used for a future frame of the video; and performing post-filter encoding of the specific frame of the video.

13. The method of claim 12, wherein the in-loop filter comprises the luma primary filter, the luma secondary filter, h chroma primary filter, and the chroma secondary filter, and wherein a preset of the preset list comprises: a luma primary filter strength parameter, a luma secondary filter strength parameter, a chroma primary filter strength parameter, and a chroma secondary filter strength parameter.

14. The method of claim 12, wherein gathering the statistics for the specific frame for determining the second set of frame-level filter parameters to be used for the future frame of the video comprises:

filtering the blocks of the specific frame using different combinations of filter strength parameters for a primary filter and a secondary filter of the in-loop filter;

gathering distortion metrics associated with the filtered blocks; and searching the gathered distortion metrics for determining the second set of frame-level filter parameters to be used for the future frame of the video.

15. The method of claim 12, wherein the single-pass processing of the specific frame comprises reading pixels after the pre-filter encoding once.

16. The method of claim 12, wherein using a first set of frame-level filter parameters determined based on a previous frame to apply an in-loop filter on blocks of the specific frame during encoding of the specific frame further includes selecting for a block of the specific frame a preset among the preset list, wherein the preset is selected based on minimizing of a mean squared error (MSE) and wherein the block has its own respective set of parameters.

17. A system, comprising:

an interface to receive a video to be encoded using a codec; and a circuitry to:
  perform pre-filter encoding of a specific frame of the video;
  in a single-pass processing of the specific frame:
    use a first set of frame-level filter parameters determined based on a previous frame to apply an in-loop filter on blocks of the specific frame during encoding of the specific frame, including determining a preset list, wherein the preset list comprises the first set of frame-level filter parameters, and wherein the preset list comprises a plurality of presets selected based on a type of content and a compression rate; and
    filtering the block of the specific frame with the in-loop filter via a luma primary filter, a luma secondary filter, a chroma primary filter, and a chroma secondary filter using the selected preset; and
  gather statistics for the specific frame for determining a second set of frame-level filter parameters to be used for a future frame of the video; and
  perform post-filter encoding of the specific frame of the video.

18. The system of claim 17, wherein the in-loop filter comprises the luma primary filter, the luma secondary filter, h chroma primary filter, and the chroma secondary filter, and wherein a preset of the preset list comprises: a luma primary filter strength parameter, a luma secondary filter strength parameter, a chroma primary filter strength parameter, and a chroma secondary filter strength parameter.

19. The system of claim 17, wherein gathering the statistics for the specific frame for determining the second set of frame-level filter parameters to be used for the future frame of the video comprises:
  filtering the blocks of the specific frame using different combinations of filter strength parameters for a primary filter and a secondary filter of the in-loop filter;
  gathering distortion metrics associated with the filtered blocks; and
  searching the gathered distortion metrics for determining the second set of frame-level filter parameters to be used for the future frame of the video.

20. The system of claim 17, wherein using a first set of frame-level filter parameters determined based on a previous frame to apply an in-loop filter on blocks of the specific frame during encoding of the specific frame, further includes selecting for a block of the specific frame a preset among the preset list, wherein the preset is selected based on minimizing of a mean squared error (MSE) and wherein the block has its own respective set of parameters.

* * * * *